(12) United States Patent
Choi

(10) Patent No.: US 11,474,638 B2
(45) Date of Patent: Oct. 18, 2022

(54) DISPLAY DEVICE AND DRIVING DEVICE FOR DRIVING A PANEL

(71) Applicant: SILICON WORKS CO., LTD., Daejeon (KR)

(72) Inventor: Jung Min Choi, Daejeon (KR)

(73) Assignee: SILICON WORKS CO., LTD., Daejeon (KR)

( * ) Notice: Subject to any disclaimer, the term of this patent is extended or adjusted under 35 U.S.C. 154(b) by 91 days.

(21) Appl. No.: 17/081,472

(22) Filed: Oct. 27, 2020

(65) Prior Publication Data

US 2021/0157467 A1    May 27, 2021

(30) Foreign Application Priority Data

Nov. 25, 2019   (KR) .................. 10-2019-0152034
Sep. 17, 2020   (KR) .................. 10-2020-0119745

(51) Int. Cl.
  *G06F 3/041*   (2006.01)
  *G06F 3/044*   (2006.01)
(52) U.S. Cl.
  CPC .......... *G06F 3/04166* (2019.05); *G06F 3/044* (2013.01); *G06F 2203/04108* (2013.01)

(58) Field of Classification Search
  CPC ............. G06F 3/04164; G06F 3/04166; G06F 3/044–0448; G06F 2203/04108
  See application file for complete search history.

(56) References Cited

U.S. PATENT DOCUMENTS

| 9,817,535 | B2 * | 11/2017 | Shepelev | G06F 3/04166 |
| 10,409,414 | B2 | 9/2019 | Kim et al. | |
| 2015/0309661 | A1 * | 10/2015 | Kim | G06F 3/04166 345/174 |
| 2016/0320886 | A1 * | 11/2016 | Kim | G06F 3/047 |
| 2017/0228084 | A1 * | 8/2017 | Kim | G06F 3/0412 |
| 2017/0255294 | A1 * | 9/2017 | Shepelev | G06F 3/04182 |

FOREIGN PATENT DOCUMENTS

KR   10-2019-0033275 A   3/2019
KR   10-2019-0067087 A   6/2019

\* cited by examiner

*Primary Examiner* — Michael Pervan
(74) *Attorney, Agent, or Firm* — Fenwick & West LLP

(57) ABSTRACT

The present disclosure relates to a technology of sensing a touch. According to the present disclosure, touch sensors are driven in a time division way using multiplexers disposed on a panel and auxiliary signals, with a same phase as that of driving signals, are supplied to electrodes around a touch sensor in driving so as to reduce the introduction of noises from the neighboring electrodes.

15 Claims, 6 Drawing Sheets

DISPLAY DEVICE AND DRIVING DEVICE FOR DRIVING A PANEL

CROSS REFERENCE TO RELATED APPLICATION

This application claims priority from Republic of Korea Patent Applications No. 10-2019-0152034 filed on Nov. 25, 2019, and Republic of Korea Patent Application No. 10-2020-0119745 filed on Sep. 17, 2020, each of which are hereby incorporated by reference in their entirety.

BACKGROUND

1. Field of Technology

The present disclosure relates to a technology for sensing touches.

2. Description of the Prior Art

A technology for perceiving a touch or the proximity of an external object to a touch panel is called a touch sensing technology. In an electronic apparatus using such a technology, a touch panel is positioned in the same plane as that of a display panel, and accordingly, a user may input user operation signals into a touch panel while the user looks at images on a display panel. Such a method of generating user operation signals is remarkably intuitive for users compared with previous other user operation signal input types, such as a mouse input type or a keyboard input type.

For such advantages, the touch sensing technology is applied to various electronic apparatuses comprising display panels.

Meanwhile, as panels for displays are enlarged, the number of touch sensors disposed on a panel increases. When the number of touch sensors increases, the number of integrated circuits for driving the touch sensors and the number of lines between the integrated circuits and the panel also increase.

SUMMARY

An embodiment of the present disclosure is to reduce the number of touch driving integrated circuits for driving a large-sized panel. Another aspect of the present disclosure is to simplify the wiring between a large-sized panel and touch driving integrated circuits.

To this end, in an embodiment, the present disclosure provides a display device comprising a panel on which a plurality of touch sensors are disposed, a plurality of internal lines respectively connected with the plurality of touch sensors are disposed, and a selecting circuit connected with the plurality of internal lines is disposed; and a driving device, connected with the touch sensors through external lines, to drive the touch sensors so as to sense the proximity or a touch of an external object to the panel, wherein the selecting circuit connects one of at least two internal lines with an external line.

The selecting circuit may be disposed in a non-display area of the panel where no pixel is disposed.

The driving device may drive the touch sensors in a self-capacitance method in which a driving signal is supplied to a touch sensor and a response signal to the driving signal is received from the touch sensor.

The selecting circuit may select one of the at least two internal lines and connect it with an external line using a plurality of switches. Control signals for the plurality of switches may be received from the driving device.

The selecting circuit may connect internal lines, which remain not connected with the external lines, with an auxiliary line and the driving device may supply an auxiliary signal, with substantially the same phase as that of a driving signal supplied through an external line, through the auxiliary line.

The selecting circuit may connect one of the at least two internal lines to the external line using a first group of switches and connect unselected internal lines to the auxiliary line using a second group of switches.

The selecting circuit may connect two switches to each internal line, one of the two switches to the external lines, and the other one of the two switches to an auxiliary line, and the driving device may supply an auxiliary signal, with substantially the same phase as that of a driving signal supplied through the external line, through the auxiliary line.

Each external line may be connected with one internal line and the auxiliary line may be connected with more than one internal line.

The driving device may supply control signals for the two switches to the selecting circuit.

The selecting circuit may connect one of two adjacent touch sensors with one of the external lines and the other touch sensor with an auxiliary line, and the driving device may supply an auxiliary signal, with substantially the same phase as that of a driving signal supplied through the external line, through the auxiliary line.

To achieve the object described above, in another aspect, the present disclosure provides a driving device for driving a panel, on which a plurality of touch sensors are disposed, a plurality of internal lines respectively connected with the touch sensors are disposed, and a selecting circuit connected with the plurality of internal lines is disposed, wherein the selecting circuit connects one of at least two internal lines with an external line, comprising a sensing circuit, which is connected with the touch sensors through external lines, to sense the proximity or a touch of an external object to the panel by driving the touch sensors; and a control circuit to control the selection of the selecting circuit by control signals.

The touch sensors may be driven in a self-capacitance method in which a driving signal is supplied to a touch sensor and a response signal to the driving signal are received from the touch sensor.

The driving device may further comprise an auxiliary signal circuit to supply an auxiliary signal, with substantially the same phase as that of a driving signal supplied by the sensing circuit through the external line, to a touch sensor through the auxiliary line.

The selecting circuit may connect internal lines, which remain not connected with the external line, with the auxiliary line.

In the selecting circuit, a plurality of switches are disposed, and the control circuit may transmit the control signals for the plurality of switches through a signal line.

As described above, according to the present disclosure, it is possible to reduce the number of touch driving integrated circuits for driving a large-sized panel. In addition, according to the present disclosure, it is possible to simplify the wiring between a large-sized panel and touch driving integrated circuit.

DETAILED DESCRIPTION

Figure 1:
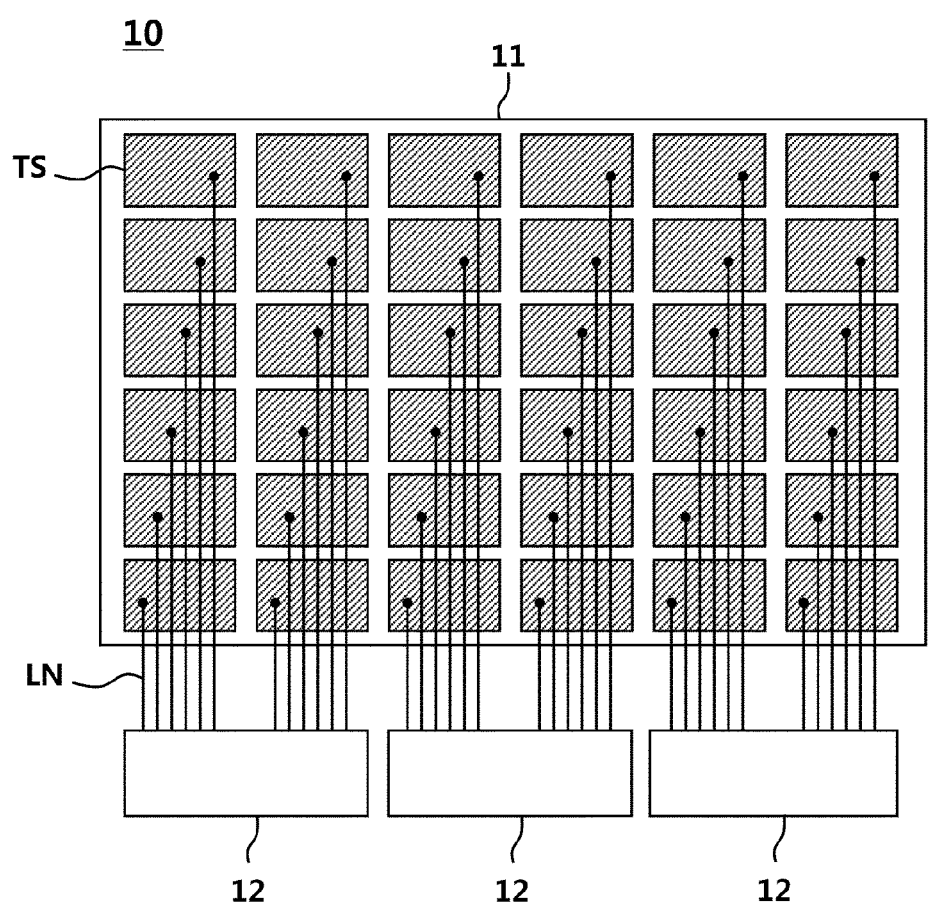
FIG. 1 is a configuration diagram of a general display device.

FIG. 1 is a configuration diagram of a general display device.

Referring to FIG. 1, a display device 10 may comprise a panel 11, integrated circuits 12, and touch lines LN.

On the panel 11, a plurality of touch sensors TS may be disposed. When an external object approaches the touch sensors TS, measured values of the touch sensors TS are changed. The integrated circuits 12 may identify a touch of the external object, coordinates of the external object, or the like by detecting such changes of the measured values. Here, a measured value may be a capacitance or a quantity of electric charge.

The touch sensors TS and the integrated circuits 12 may be connected through the touch lines LN. The integrated circuits 12 may sense a touch of the external object to the panel 11 by transmitting driving signals through the touch lines and receiving response signals of the touch sensors TS to the driving signals.

A general display device 10 may comprise as many touch lines LN as the number of the touch sensors TS. Some of the touch lines LN are disposed in the panel 11 and the rest of the touch lines LN may be disposed on a flexible printed circuit board (FPCB) and connected with the integrated circuits 12.

Since the number of touch sensors TS disposed on a panel 11 increases as panels 11 are enlarged, the number of integrated circuits 12 and the number of touch lines LN also increase.

In a display device according to an embodiment, a selecting circuit is disposed on a panel so as to reduce the number of integrated circuits and the number of touch lines.

Figure 2:
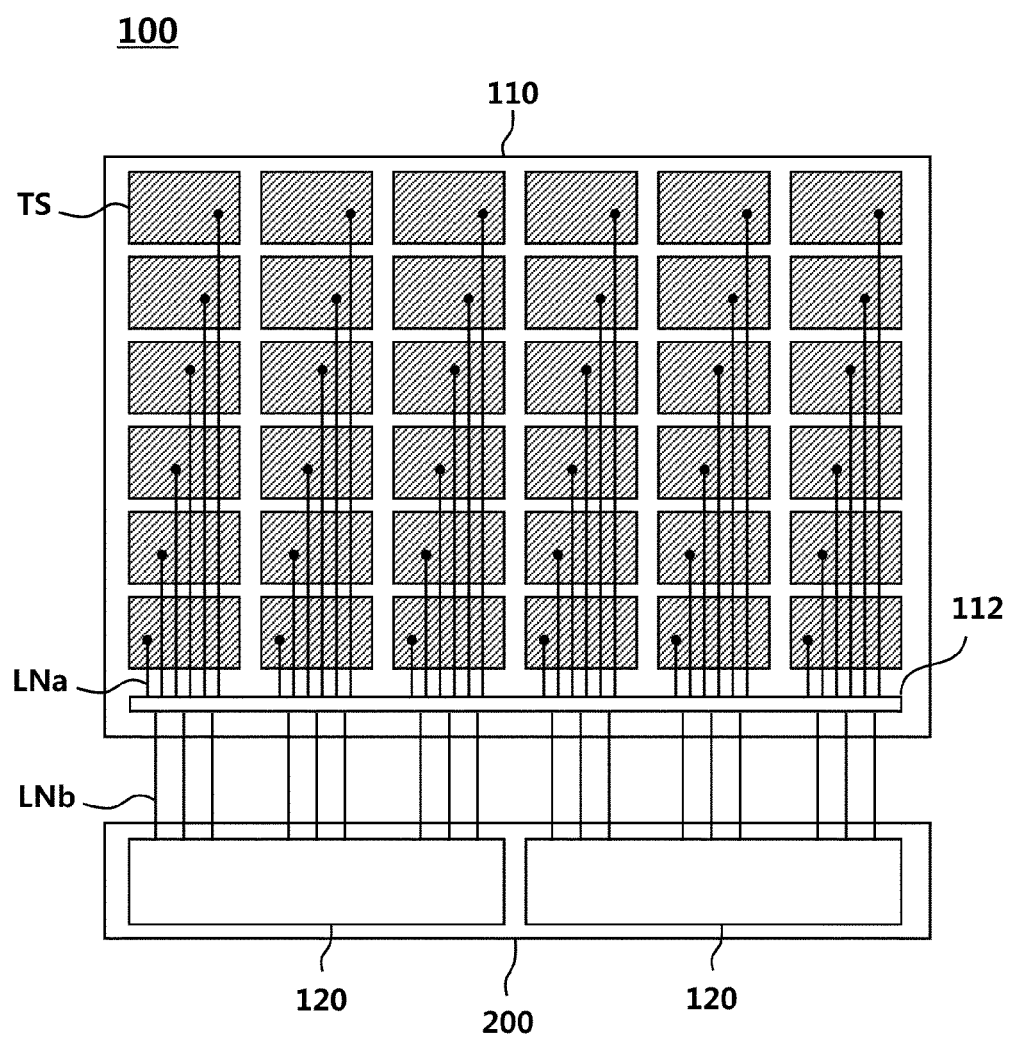
FIG. 2 is a configuration diagram of a display device according to an embodiment of the present disclosure.

FIG. 2 is a configuration diagram of a display device according to an embodiment of the present disclosure.

Referring to FIG. 2, a display device 100 may comprise a panel 110 and a driving device 200.

Touch lines connecting touch sensors TS and the driving device 200 may be divided into internal lines LNa and external lines LNb.

In the display device 100 according to an embodiment, the number of the external lines LNb may be less than the number of the internal lines LNa. In the panel 110, a selecting circuit 112 may be disposed. Since the selecting circuit 112 selectively connects the touch sensors TS with the driving device 200, the number of the external lines LNb may be less than the number of the internal lines LNa.

In addition, the number of the integrated circuits 120 comprised in the driving device 200 may be reduced. Since the number of the external lines LNb in the display device 100 according to an embodiment is reduced, the number of sensing channels is reduced, and therefore, the number of the integrated circuits 120 as well is reduced.

The selecting circuit 112 may comprise a multiplexer (MUX) and connect one of at least two internal lines LNa with an external line LNb by the control of the MUX.

The MUX may comprise a plurality of switches and control signals for the on/off of the switches may be received from the driving device 200.

Figure 3:
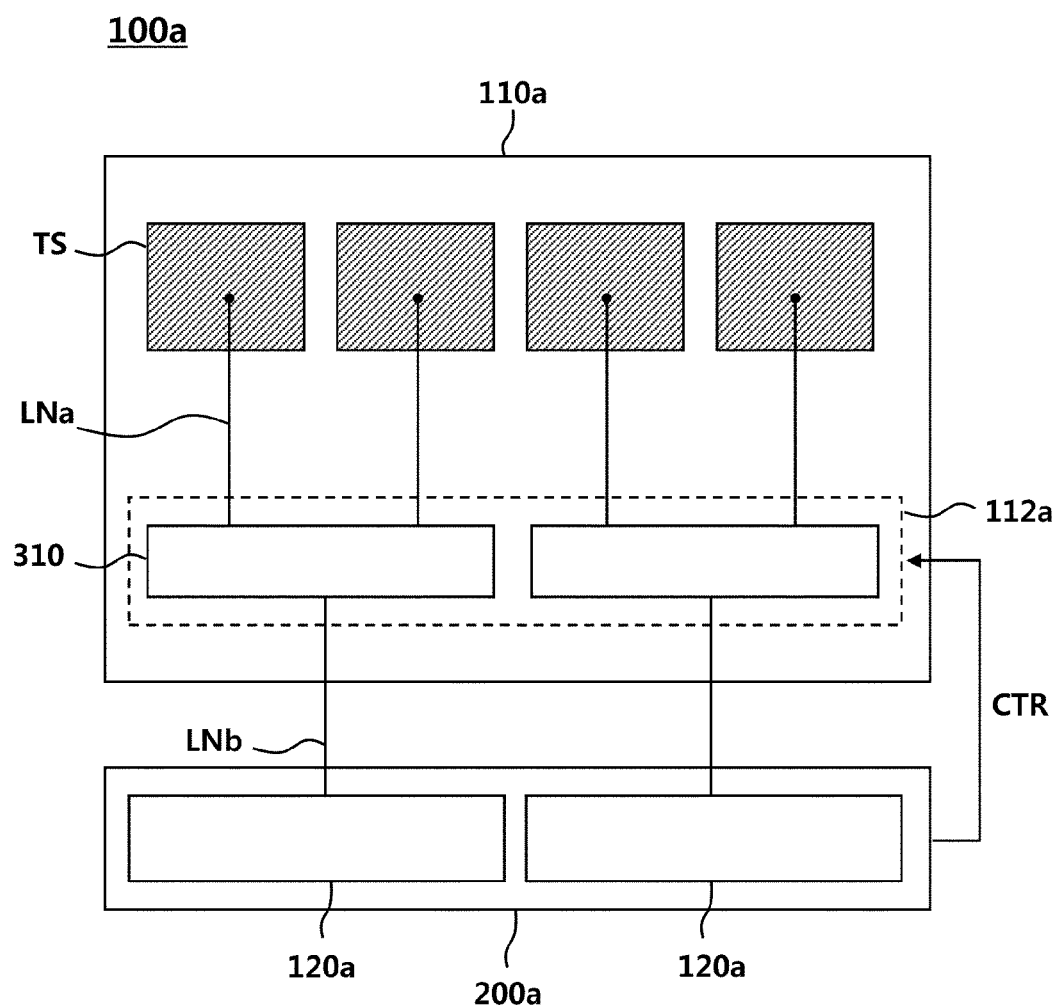
FIG. 3 is a configuration diagram of a first example of a display device according to an embodiment of the present disclosure.

FIG. 3 is a configuration diagram of a first example of a display device according to an embodiment of the present disclosure.

Referring to FIG. 3, a display device 100a may comprise a panel 110a and a driving device 200a.

In the panel 110a, a plurality of touch sensors TS may be disposed and a plurality of internal lines LNa connected with the touch sensors TS may be disposed. In addition, in the panel 110a, a selecting circuit 112a, to be connected with the plurality of internal lines LNa and to select one of the internal lines LNa and connect it with an external lines LNb, may be disposed.

The selecting circuit 112a may comprise a plurality of MUXs 310 and each MUX 310 may connect one of at least two touch sensors TS with an external line LNb.

The driving device 200a may comprise at least one integrated circuit 120a.

The driving device 200a may comprise a sensing circuit (not shown) and a control circuit (not shown). The sensing circuit and the control circuit may be included respectively in the integrated circuits 120a or in the outside of the integrated circuits 120a, for example, in a printed circuit board (PCB).

The control circuit may transmit a control signal CTR to the selecting circuit 112a and the selecting circuit 112a may control the MUXs 310 using the control signal CTR.

Figure 4:
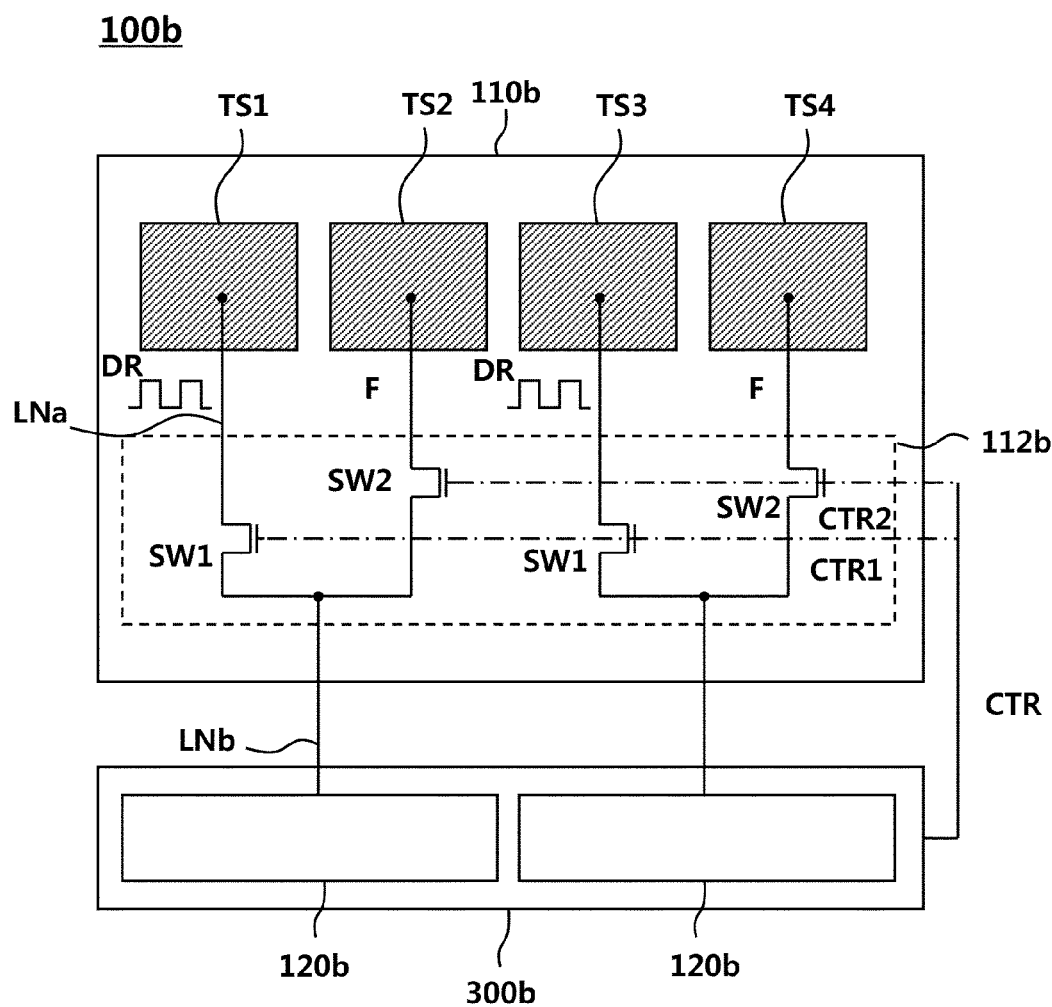
FIG. 4 is a configuration diagram of a second example of a display device according to an embodiment of the present disclosure.

FIG. 4 is a configuration diagram of a second example of a display device 100b according to an embodiment of the present disclosure.

Referring to FIG. 4, in a panel 110b, a plurality of touch sensors TS1-TS4 may be disposed and a plurality of internal lines LNa connected with the touch sensors TS1-TS4 may be disposed. In addition, in the panel 110b, a selecting circuit 112b to be connected with the plurality of internal lines LNa and to selectively connect the internal lines LNa with external lines LNb may be disposed.

The selecting circuit 112b may be disposed in a non-display area of the panel 110b where no pixel is disposed.

The selecting circuit 112b may select one of at least two internal lines LNa and connect the selected one with an external line LNb using a plurality of switches SW1, SW2. Control signals CTR for the plurality of switches SW1, SW2 may be received from a driving device 300b.

The driving device 300b may comprise at least one integrated circuit 120b, supply driving signals DR to the touch sensors TS1-TS4 using the integrated circuit 120b, and receive response signals to the driving signals DR from the touch sensors TS1-TS4 so as to sense a touch of an external object to the panel 110b.

The driving device 300b may drive the touch sensors TS1-TS4 in a self-capacitance method in which an electrode to supply driving signals DR and an electrode to receive response signals are the same.

Adjacent touch sensors TS1-TS4 may be connected with the driving device 300b respectively in different time sections.

Referring to FIG. 4, a first touch sensor TS1 and a third touch sensor TS3 may be connected with first switches SW1 and a second touch sensor TS2 and a fourth touch sensor TS4 may be connected with second switches SW2.

In a first time section, the driving device 300b may turn on the first switches SW1 using a first control signal CTR1 and turn off the second switches SW2 using a second control signal CTR2. In addition, the driving device 300b supplies driving signals DR through the external lines LNb in the first time section and the first touch sensor TS1 and the third touch sensor TS3 may be driven according to the driving signals DR.

In a second time section, the driving device 300b may turn off the first switches SW1 using the first control signal CTR1 and turn on the second switches SW2 using the second control signal CTR2. In addition, the driving device 300b supplies driving signals DR through the external lines LNb in the second time section and the second touch sensor TS2 and the fourth touch sensor TS4 may be driven according to the driving signals DR.

The integrated circuits 120b may transmit the first control signal CTR1 and the second control signal CTR2 or another circuit may transmit the first control signal CTR1 and the second control signal CTR2. The driving device 300b may comprise a timing control circuit to control the timing for driving the integrated circuits 120b and the timing control circuit may generate and transmit the first control signal CTR1 and the second control signal CTR2.

Meanwhile, in the first time section, the second touch sensor TS2 and the fourth touch sensor TS4 may be floated. Between adjacent touch sensors TS1-TS4, parasitic capacitances may be formed. Touch sensors in floating, which are the second touch sensor TS2 and the fourth touch sensor TS4, may introduce noises through the parasitic capacitances to surrounding touch sensors, which are the first touch sensor TS1 and the third touch sensor TS3. This may result in decreasing the touch sensitivity of the touch sensors.

Figure 5:
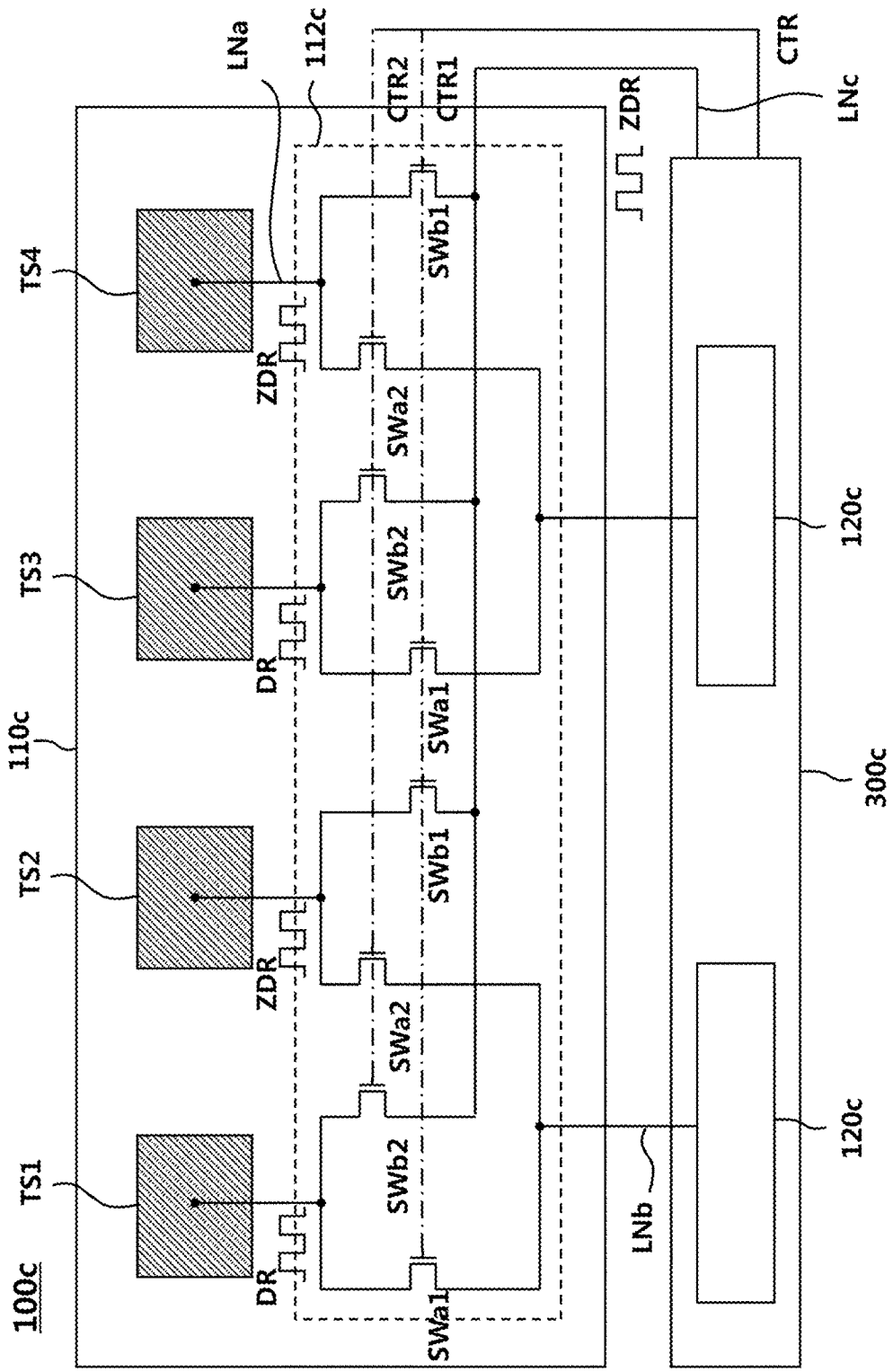
FIG. 5 is a configuration diagram of a third example of a display device according to an embodiment of the present disclosure.

FIG. 5 is a configuration diagram of a third example of a display device 100c according to an embodiment of the present disclosure.

Referring to FIG. 5, in a panel 110c, a plurality of touch sensors TS1-TS4 may be disposed and a plurality of internal lines LNa connected with the touch sensors TS1-TS4 may be disposed. In addition, in the panel 110c, a selecting circuit 112c to be connected with the plurality of internal lines LNa and to selectively connect the internal lines LNa with external lines LNb may be disposed.

The selecting circuit 112c may be disposed in a non-display area where no pixel is disposed.

The selecting circuit 112c may select one of at least two internal lines LNa and connect the selected one with an external line LNb using a plurality of switches SWa1, SWa2, SWb1, SWb2. Control signals CTR for the plurality of switches SWa1, SWa2, SWb1, SWb2 may be received from a driving device 300c.

The driving device 300c may comprise at least one integrated circuit 120c, supply driving signals DR to the touch sensors TS1-TS4 using the integrated circuit 120c, and receive response signals to the driving signals from the touch sensors TS1-TS4 so as to sense a touch of an external object to the panel 110c.

The driving device 300c may drive the touch sensors TS1-TS4 in a self-capacitance method in which an electrode to supply driving signals DR and an electrode to receive response signals are the same.

Adjacent touch sensors TS1-TS4 may be connected with the driving device 300c respectively in different time sections.

The plurality of switches SWa1, SWa2, SWb1, SWb2 may be classified into a first group of switches SWa1, SWa2 and a second group of switches SWb1, SWb2. The first group of switches SWa1, SWa2 may control the connection between the internal lines LNa and the external lines LNb and the second group of switches SWb1, SWb2 may control the connection between the internal lines LNa and an auxiliary line LNc.

Referring to FIG. 5, a first touch sensor TS1 may be connected with an external line LNb through a first switch SWa1 of the first group and with the auxiliary line LNc through a second switch SWb2 of the second group. A second touch sensor TS2 may be connected with an external line LNb through a second switch SWa2 of the first group and with the auxiliary line LNc through a first switch SWb1 of the second group. A third touch sensor TS3 may be connected with an external line LNb through the first switch SWa1 of the first group and with the auxiliary line LNc through the second switch SWb2 of the second group. A fourth touch sensor TS4 may be connected with an external line LNb through the second switch SWa2 of the first group and with the auxiliary line LNc through the first switch SWb1 of the second group.

The driving device 300c may transmit a first driving signal CTR1, to turn on the first switch SWa1 of the first group and the first switch SWb1 of the second group in a first time section and to turn off the first switch SWa1 of the first group and the first switch SWb1 of the second group in a second time section, to the selecting circuit 112c.

In addition, the driving device 300c may transmit a second driving signal CTR2, to turn off the second switch SWa2 of the first group and the second switch SWb2 of the second group in the first time section and to turn on the second switch SWa2 of the first group and the second switch SWb2 of the second group in the second time section, to the selecting circuit 112c.

By such control, the first touch sensor TS1 and the third touch sensor TS3 are connected with the external lines LNb and the second touch sensor TS2 and the fourth touch sensor TS4 are connected with the auxiliary line LNc in the first time section, whereas the second touch sensor TS2 and the fourth touch sensor TS4 are connected with the external lines LNb and the first touch sensor TS1 and the third touch sensor TS3 are connected with the auxiliary line LNc in the second time section.

The driving device 300c may supply, to the touch sensors, driving signals DR through the external lines LNb and auxiliary signals ZDR with the same phase and/or the same size as those of the driving signals DR through the auxiliary line LNc. Accordingly, in the first time section, driving signals DR may be supplied to the first touch sensor TS1 and the third touch sensor TS3 and auxiliary signals ZDR may be supplied to the second touch sensor TS2 and the fourth touch sensor TS4.

According to such control, since auxiliary signals ZDR with the same phase as that of driving signals DR are supplied to touch sensors around a touch sensor in driving, it is possible to reduce the noise introduction due to parasitic capacitances.

Figure 6:
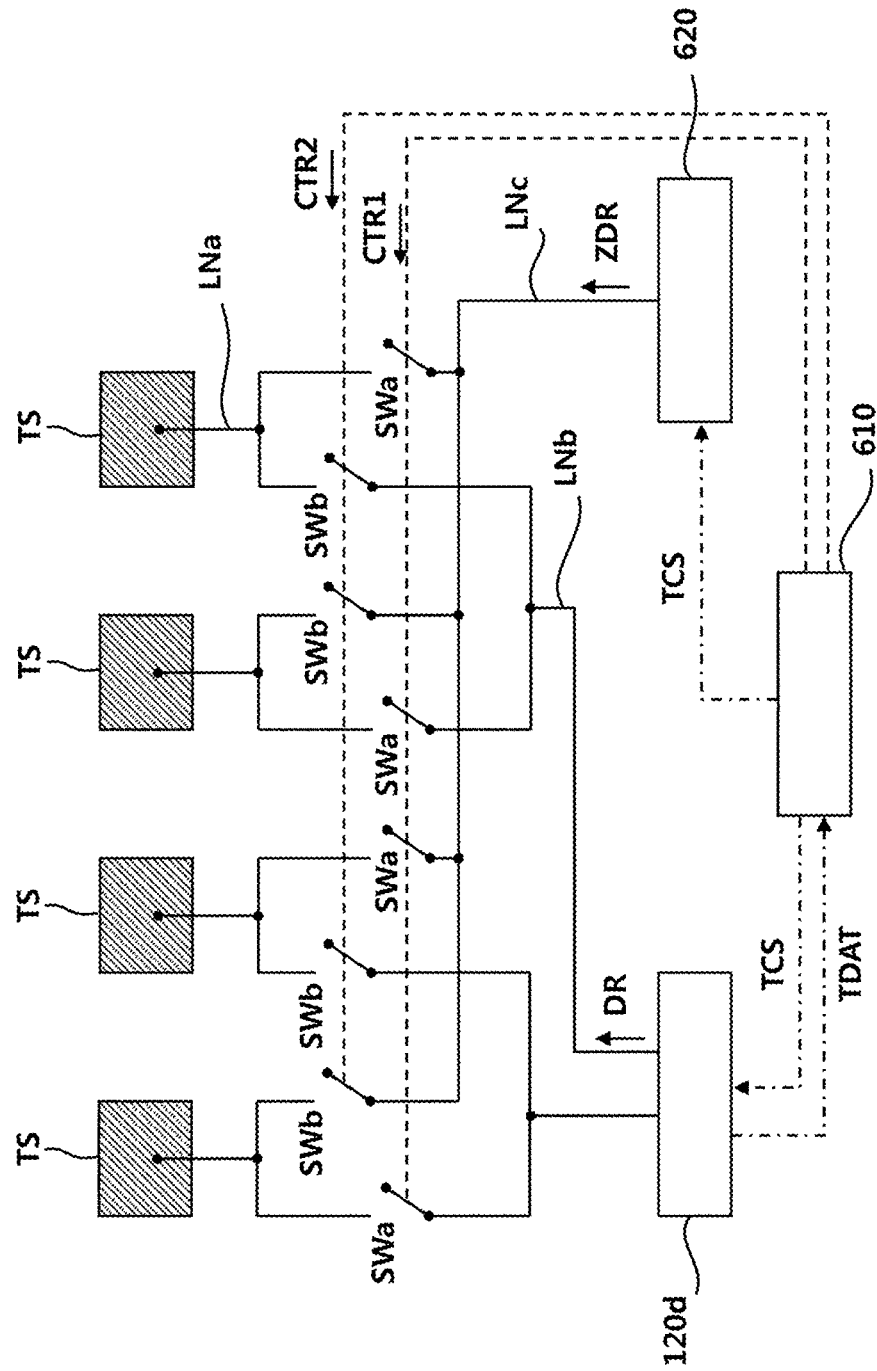
FIG. 6 is a configuration diagram of a fourth example of a display device according to an embodiment of the present disclosure.

FIG. 6 is a configuration diagram of a fourth example of a display device according to an embodiment of the present disclosure.

A driving device may comprise an integrated circuit 120d, an auxiliary signal generating circuit 620, and a timing control circuit 610.

The integrated circuit 120*d* may transmit a driving signal DR to an external line LNb and receive a response signal from the external line LNb.

The external line LNb may be connected with one of a plurality of internal lines LNa according to control signals CTR1, CTR2 and internal lines LNa may respectively be connected with touch sensors TS. Such a connection allows a driving signal DR to be supplied to one of a plurality of touch sensors TS.

The timing control circuit 610 may generate a timing signal TCS and transmit the timing signal TCS to the integrated circuit 120*d* and the auxiliary signal generating circuit 620.

The integrated circuit 120*d* and/or the auxiliary signal generating circuit 620 may distinguish between a display time section and a touch time section using a timing signal TCS. The integrated circuit 120*d* may transmit a driving signal DR through an external line LNb in the touch time section and may not transmit the driving signal DR through the external line LNb in the display time section. The auxiliary signal generating circuit 620 may transmit an auxiliary signal ZDR through an auxiliary line LNc in the touch time section and may not transmit the auxiliary signal ZDR through the auxiliary line LNc in the display time section.

The timing control circuit 610 may generate control signals CTR1, CTR2 and transmit the control signals CTR1, CTR2 to a first group of switches SWa and a second group of switches SWb.

In a first time section, the first group of switches SWa may be turned on according to the first control signal CTR1 and the second group of switches SWb may be turned off according to the second control signal CTR2. In a second time section, the first group of switches SWa may be turned off according to the first control signal CTR1 and the second group of switches Swb may be turned on according to the second control signal CTR2.

The integrated circuit 120*d* may transmit sensing data TDAT for a touch sensor TS to the timing control circuit 610 and the timing control circuit 610 may calculate touch coordinates of an external object using the sensing data TDAT.

The integrated circuit 120*d* may comprise an internal multiplexer (MUX) therein. A MUX disposed on the panel may be referred to as an external MUX. The integrated circuit 120*d* may use the internal MUX and the external MUX so that one sensing channel senses a plurality of touch sensors TS.

For example, the external MUX may connect one of N (N is a natural number, which is 2 or higher) touch sensors TS to one external line LNb and the internal MUX may connect one of M (M is a natural number, which is 2 or higher) external lines LNb to one sensing channel. Here, the one sensing channel may sequentially sense N×M touch sensors.

According to an embodiment described above, the MUX disposed on the panel allows the number of lines between the panel and the driving device and the number of integrated circuits for driving touch sensors to be reduced.

What is claimed is:

1. A display device comprising:
    a panel in which a plurality of touch sensors are disposed, a plurality of internal lines respectively connected with the plurality of touch sensors are disposed, and a selecting circuit connected with the plurality of internal lines is disposed; and
    a driving device, which is connected with the plurality of touch sensors through a plurality of external lines, to drive the plurality of touch sensors so as to sense a proximity or a touch of an external object to the panel,
    wherein the selecting circuit connects one of at least two internal lines from the plurality of internal lines with an external line from the plurality of external lines, and
    wherein the selecting circuit connects internal lines, which remain not connected with the plurality of external lines, with an auxiliary line.

2. The display device of claim 1, wherein the selecting circuit is disposed in a non-display area where no pixel is disposed.

3. The display device of claim 1, wherein the driving device drives the plurality of touch sensors in a self-capacitance method in which a driving signal is supplied to a touch sensor and a response signal to the driving signal is received from the touch sensor.

4. The display device of claim 1, wherein the selecting circuit selects one of the at least two internal lines from the plurality of internal lines and connects the selected internal line with the external line using a plurality of switches and control signals for the plurality of switches are received from the driving device.

5. The display device of claim 1, wherein the driving device supplies an auxiliary signal, with substantially a same phase as that of driving signals supplied through the plurality of external lines, through the auxiliary line.

6. The display device of claim 5, wherein the selecting circuit connects one of the at least two internal lines with the external line using a first group of switches and connects the internal lines, which remain not connected, with the auxiliary line using a second group of switches.

7. The display device of claim 1, wherein the selecting circuit connects two switches with each internal line from the plurality of internal lines, one of the two switches with an external line from the plurality of external lines, and another one of the two switches with the auxiliary line, and the driving device supplies an auxiliary signal, with substantially a same phase as that of a driving signal supplied through the external line, through the auxiliary line.

8. The display device of claim 7, wherein each external line from the plurality of external lines is connected with one internal line from the plurality of internal lines and the auxiliary line is connected with more than one internal line from the plurality of internal lines.

9. The display device of claim 7, wherein the driving device supplies control signals for the two switches to the selecting circuit.

10. The display device of claim 1, wherein the selecting circuit connects a first one of two adjacent touch sensors with one of the plurality of external lines and a second one of the two touch sensors with the auxiliary line, and the driving device supplies an auxiliary signal, with substantially a same phase as that of a driving signal supplied through the one of the plurality of external lines, through the auxiliary line.

11. A driving device for driving a panel, on which a plurality of touch sensors are disposed, a plurality of internal lines connected respectively with the plurality of touch sensors are disposed, a selecting circuit connected with the plurality of internal lines is disposed, wherein the selecting circuit connects one of at least two internal lines from the plurality of internal lines with an external line, comprising:
    a sensing circuit, which is connected with the plurality of touch sensors through a plurality of external lines, to drive the plurality of touch sensors so as to sense a proximity or a touch of an external object to the panel; and a control circuit to control a selection of the selecting circuit using control signals, wherein the selecting circuit connects internal lines, which remain not connected with the plurality of external lines, with an auxiliary line.

12. The driving device of claim 11, to drive the touch sensors in a self-capacitance method in which a driving signal is supplied to a touch sensor from the plurality of touch sensors and a response signal to the driving signal is received from the touch sensor.

13. The driving device of claim 11, further comprising an auxiliary signal circuit to supply an auxiliary signal, with substantially a same phase as that of a driving signal supplied by the sensing circuit through the external line, to a touch sensor through the auxiliary line.

14. The driving device of claim 13, wherein the selecting circuit connects internal lines from the plurality of internal lines, that are not connected with the external line, with the auxiliary line.

15. The driving device of claim 11, wherein the selecting circuit comprises a plurality of switches and the control circuit transmits the control signals for the plurality of switches through a signal line.

\* \* \* \* \*